United States Patent
Daugherty et al.

Patent Number: 5,445,088
Date of Patent: Aug. 29, 1995

[54] PROCESS FOR THE DISPOSAL OF MUNICIPAL REFUSE AND CERTAIN HAZARDOUS WASTE

[76] Inventors: William K. Daugherty, P.O. Box 1088, Lake City, Fla. 32056; Bernard A. Parkin, Jr., Rte. 10, Box 207, Lake City, Fla. 32055; Franklin D. Ling, Rte. 1 Box 281-34, Micanopy, Fla. 32667

[21] Appl. No.: 75,721

[22] Filed: May 21, 1993

Related U.S. Application Data

[63] Continuation-in-part of Ser. No. 874,953, Jul. 2, 1992, abandoned.

[51] Int. Cl.$^6$ .............................................. F23G 5/00
[52] U.S. Cl. ..................... 110/346; 110/233; 110/235; 110/242
[58] Field of Search ............... 110/346, 242, 233, 235, 110/237; 588/201

[56] References Cited

U.S. PATENT DOCUMENTS

| | | | |
|---|---|---|---|
| 4,632,690 | 12/1986 | Colwell, Jr. et al. | 588/201 X |
| 5,022,848 | 6/1991 | Fowler | 110/242 X |
| 5,133,267 | 7/1992 | Kent et al. | 110/344 |
| 5,191,846 | 3/1993 | Clay | 110/346 |
| 5,206,879 | 4/1993 | Moody et al. | 110/346 X |
| 5,289,786 | 3/1994 | Clay | 110/233 |

Primary Examiner—Edward G. Favors

[57] ABSTRACT

This abstract describes a process for the complete oxidation of municipal refuse and certain hazardous materials. The facility to accommodate the process consists of a completely enclosed, rotating, cylindrical kiln wherein solids, liquids, and gaseous compounds are simultaneously oxidized. To supplement the burning process, natural gas will be injected into the kiln chamber through a regulatory apparatus. Within the oxidation chamber, temperatures of 3200 degrees F., plus, will be maintained by injecting a regulated flow of pure oxygen, as an oxidant, to ensure the complete oxidation of all materials. After suitable preparation, solids and liquids will be introduced into the kiln chamber through an enclosed, sealed, apparatus i.e., screw conveyor, to control refuse volumes. During the oxidation process, the refuse materials will be kept in suspension for an adequate dwell time by the tilted orientation and rotating operation of the kiln apparatus. Any liquid residue will form a liquid bed at the low end of the chamber while the gaseous residue will rise to the high end. As a result, the liquid residue will continuously exit the chamber through an enclosed trap apparatus, while the gaseous residue will continuously exit the chamber through an enclosed duct system. After exiting the chamber, the liquid residue will be cooled and restructured into environmentally safe products. After exiting the chamber, the gaseous residue will be compressed, cooled, and fractionated into environmentally safe products.

7 Claims, 1 Drawing Sheet

PROCESS FOR THE DISPOSAL OF MUNICIPAL REFUSE AND CERTAIN HAZARDOUS WASTE

This is a continuation-in-part of application Ser. No. 07/874,953 filed on Jul. 2, 1992 now abandoned.

BACKGROUND AND OBJECTIVES OF THE INVENTION

Municipal refuse consists of garbage, rubbish, ashes, street sweepings, stable refuse, offal or market refuse, dead animals, and industrial refuse (including waste building materials). The first three classes constitute the principal part of municipal refuse.

The present invention relates to a process for the oxidation of municipal refuse and to restructure the residues into environmentally safe marketable products, e.g., solid or liquid carbon dioxide, pure water and glass like materials.

Disposal of municipal refuse is a serious problem confronting societies throughout the world today. The greatest percentage of municipal refuse is disposed of by recycling, incineration and landfills. Such attempts are noble, but have been virtually unsuccessful in addressing the ultimate solution; no requirements for landfills and/or sewers. By-in-large, incineration destroys a wide variety of refuse materials, but in the process produces substantial volumes of solid and gaseous residues which are respectively deposited into landfills or escape into the atmosphere.

The need for proper and cost effective disposal of municipal refuse is an accepted reality. Although efforts, to date, have provided a limited means of refuse disposal, more stringent environmental controls and economic feasibility has substantially reduced their viability. Landfills, for example, have historically evolved from simple individual disposal to massive municipal disposal sites. Despite current efforts, the ever increasing volume of municipal refuse has resulted in substantial land commitments and costly landfills. Today, the development of landfill areas has soared to an estimated cost of approximately $750,000 per acre in some geographical areas. Such undesirable land use and costs coupled with staggering volumes of municipal refuse identifies the need for the present invention.

Therefore, it is the primary objective of the present invention to provide a process capable of completely oxidizing large volumes of municipal refuse thereby requiring no landfills or sewers.

It is a particular objective of this invention to provide a disposal process capable of using certain hazardous waste in conjunction with the oxidation of municipal refuse.

It is another objective of this invention to provide a process for complete oxidation of all volatile materials by using pure oxygen as an oxidant.

It is still another objective of this invention to provide a refuse disposal process capable of eliminating carbonaceous materials.

It is yet another objective of this invention to be used in conjunction with a closed facility design which will prevent escape of gases or liquids into the environment.

It is a further objective of this invention to provide a subsequent process which utilizes the high energy content, derived from the process, to sustain the energy needs of the site facilities.

It is still a further objective of this invention to provide a subsequent process whereby liquid residues will be restructured into environmentally safe marketable products.

It is yet a further objective of this invention to provide a subsequent process whereby gaseous residues will be compressed, cooled, and fractionated into environmentally safe marketable products.

These and other objectives of the present invention will be more fully disclosed in the detailed specification in conjunction with the accompanying block diagram drawing; FIG. 1.

SUMMARY OF THE INVENTION

In achieving these and other objects of the invention, the present process provides the means to economically dispose of municipal type refuse with little or no environmental pollution by combustion at 3200 degrees F.

The present continuous process is different from similar patented processes in that it uses undiluted gaseous oxygen as the oxidant and natural gas as the auxiliary heat source thus allowing gaseous pollutants such as nitrogen compounds to be minimized. This eliminates the need for free air to be introduced into the process. The noxious gaseous nitrogen compounds are thus eliminated and no pollution occurs from the source. The uses of gaseous oxygen rather than air also increases the thermal efficiency of the process. The inert nitrogen present in the air adds nothing to the combustion of the refuse and, in the process described herein, will not require the expenditure of energy to heat and cool the nitrogen.

Another feature of the process is that the use of liquid oxygen in lieu of air produces a high fraction of $CO_2$ in the exhaust gases and liquid or solid $CO_2$ can be economically produced. The sale of these valuable by-products will tend to reduce the overall cost of residue disposal.

Distilled water and products from the molten ash are also saleable and will further reduce processing cost. The availability of inexpensive distilled water will become more and more important as pure water from naturally occurring sources become more scarce and standards for processed drinking water become more stringent.

Another significant advantage of the process is the near elimination of the need for landfill disposal of solid pollutants. If temporary long-term storage of the non-polluting solid products is required, simple storage areas can be used and the solid products can easily be reclaimed whenever they are needed. As envisioned, no sewage treatment, except for human waste generated on site, will be needed.

In conjunction, hazardous wastes that are compatible with this system can be processed. The addition of special equipment could be required to handle the unique products of combustion of a particular hazardous material.

The present process has been designed so as to not discharge pollutants into the environment. However, if leakages do occur, operation of the facility can be halted at any time for necessary repairs or other corrective measures to be taken.

To accommodate the present invention, the facility size is scaleable over a wide range of capacities from the technical standpoint, i.e., from 300 tons/day to 3,000 tons/day. However, small plants may not be as economically feasible as large facilities because the cost per ton of capacity will go up as plant size is decreased. The turndown ratio of a large facility is expected to be in excess of 4 to 1.

All components of the present process are conventional state-of-the-art, commercially available items. It is their application which is unique to the present process. Most of the process involves non-corrosive materials which will allow extensive use of relatively inexpensive carbon steel components. In most areas, exotic materials of construction will not be required. Little or no odors will be discharged to the atmosphere because obnoxious fumes, from the residue, will be collected at all points of exposure to the atmosphere. Liquid scrubbers will be used to remove the vapor from entrained air and only pure air will be returned to the atmosphere.

In conjunction with the present process, other benefits are derived. For example, the co-generation of electricity, on site, should reduce or eliminate the need for additional commercial generating capacity. The facility will probably produce more electricity than is required on site. The surplus power can be sold thereby further improving the economic performance of the facility. Also, if economically favorable, steam produced by the process could be provided to off site users such as paper mills and food processing plants.

The water from the residue and the combustion of carbon/hydrogen materials will produce more water than required for the present process. Therefore, the use of water from natural sources will be quite small if not completely eliminated.

DETAILED DESCRIPTION

Figure 1:
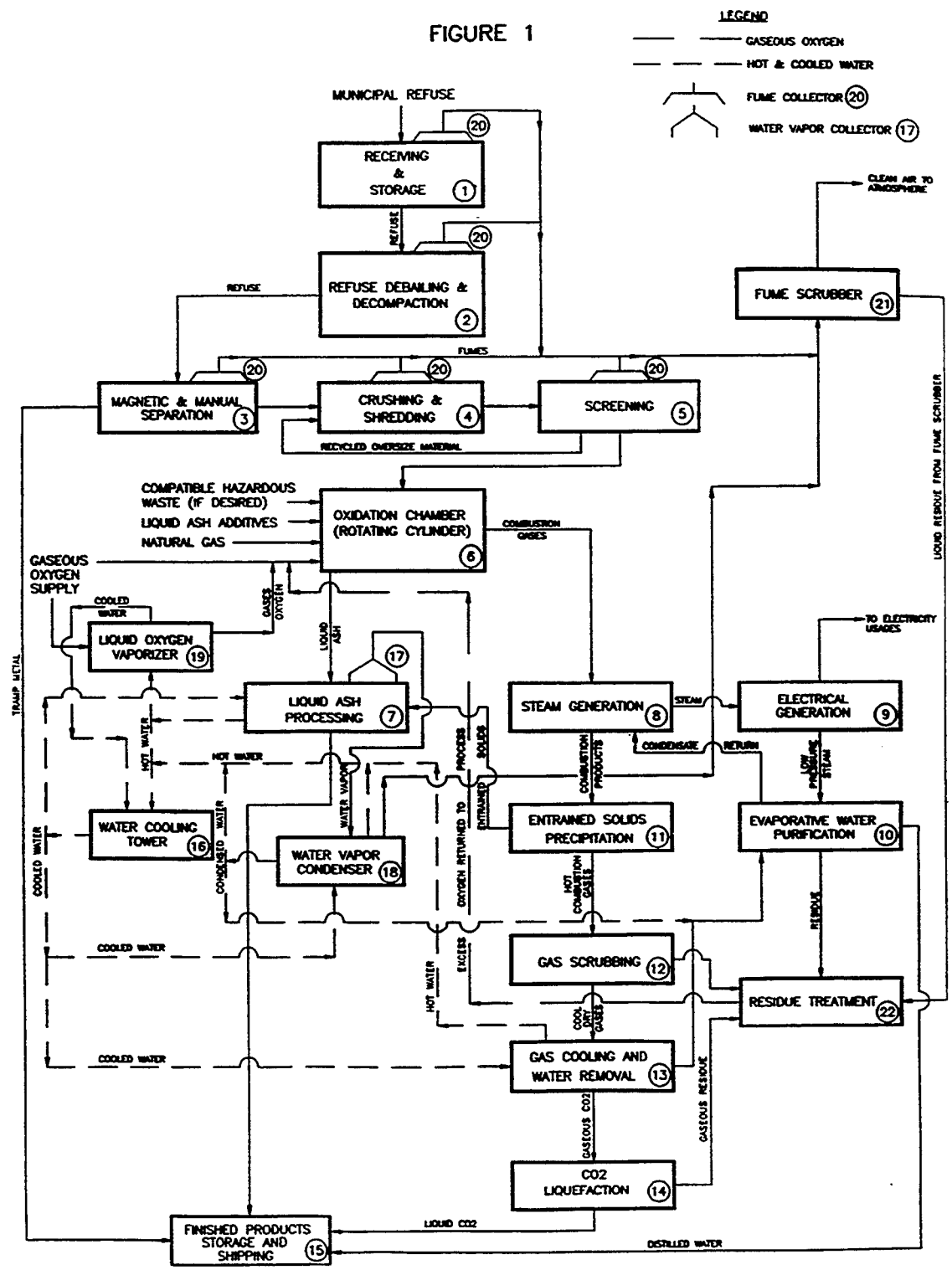
FIG. 1 is a block diagram of the facility for the oxidation of municipal refuse and certain hazardous waste in accordance with the present invention. Objects and advantages of the present invention will become apparent from the following detailed description of the present process in conjunction with the accompanying drawing.

Referring to FIG. 1 wherein the block diagram of the site facility illustrates the operational areas of the present process. The receiving and storage facilities [1] will provide for receiving municipal refuse delivered by barge, rail or trucks as deemed appropriate. Movement of the refuse through this area will be by belt conveyors. Space for storage of a four day supply of refuse will be provided. The storage areas will be enclosed and odor control equipment will be installed. The storage area's roof will keep rain water from contacting the refuse thereby eliminating polluted run-off. Bales and loose refuse will be conveyed to the preparation area [2] for de-baling and de-compaction. Continuous visual observation and manual separation by operators will be utilized to detect and remove large incompatible objects. In this area [3], all metallic objects will be removed by use of electromagnetic devices. Tramp metal will be disposed of as scrap. The remaining refuse will then be conveyed to area [4] where it will be crushed and shredded prior to screening for sizing purposes. The screening area [5] provides a vibrating screen apparatus used to separate oversized objects which will be returned to area [4] for additional crushing and shredding.

Once the refuse has been suitably sized, it will be injected into the rotating, cylindrically shaped oxidation chamber [6] which is equipped with mechanical sealing devices on each end and maintained at a slight positive pressure to eliminate the possibility of the ingestion of air (along with nitrogen in the air). Undiluted gaseous oxygen and natural gas are also injected into the oxidation chamber [6] to provide the proper materials for combustion or melting of the refuse at a temperature of approximately 3200 degrees F. The chamber will be of sufficient volume to allow the necessary dwell time to assure complete combustion, molecular changes and melting of the refuse.

A pool of molten liquid will be maintained in the chamber by a circumferential dam inside the furnace to allow for additional time for metals to melt. Upon completion of the oxidation process [6], the molten liquids will drain from the chamber's discharge area through a "U" shaped liquid trap. This will prohibit gases from escaping into the atmosphere. The hot liquid will then be processed into non-polluting saleable products such as bricks, blocks, structural shapes and aggregates as required to meet market demands. These materials will then be sent to the finished product storage and shipping area [15].

The gaseous products of combustion will feed via ceramic lined duct work to the steam generation area [8] for recovery of waste heat using either fire tube or water tube boilers. Selection of a particular type of boiler will be dictated by economic consideration.

The resulting high pressure, high temperature steam will then be piped to the co-generating area [9] to drive electrical generation equipment which will provide electrical power throughout the facility complex. Excess electricity will be sold to the local power network. The electrical system will be designed to allow the complex to operate on purchased electricity if the need arises. As an alternative, low pressure steam could be extracted from the turbine and sold for use in other processes that require an auxiliary source of steam.

Once the high energy content has been used, the steam will enter the evaporative water purification area [10]. Sufficient low pressure will be extracted from the turbine and piped to the water evaporators where distilled water will be produced. The liquid and gases residue from the evaporators will be piped to the residue treatment area [22] where contaminants will be removed. Once the undesirable residue components are removed, the water and gases will be returned to the process at the appropriate areas. As the combustion gases emerge from the steam generation area [8], they will be ducted to the solids entrainment separator area [11] where non-combustible solids are removed. The solids will subsequently be used as a filler material in the processing of liquid ash materials [7].

The gaseous CO2 will enter the scrubber area [12] where they will be further cleaned and scrubbed with water to remove all remaining solids. Once the gases have been cleaned of solids, they will travel through duct work to the gas cooling and water removal area [13]. This area of the process will be accomplished by utilizing cool water, chilled water and desiccating liquid (H2SO4) as required. The purified carbon dioxide gases and other gaseous constituents will then enter the liquefaction area [14] where hey will be converted to solid or liquid CO2 using conventional liquefaction processing units. The finished products will then be sent to the storage and shipping area [15] for distribution using conventional, commercial available units.

In conjunction with the liquid ash processing area [7], the waste heat water vapor from the processing equipment will be cooled using an updraft cooling tower [16].

The water vapor will then be collected through the use of hood covers at the water vapor discharge point [17] in the process and ducted to the condenser area [18]. At this area [18] of the process the water vapor from the collector [17] will be condensed using a shell and tube heat exchanger supplied with water from the cooling tower [16]. The condensed water vapor can be recycled or sent to the distilled water evaporators [10]. The liquid oxygen generated by the process will be vaporized for use in the combustion chamber [6] using hot water from the liquid ash processing area [7] and steam extracted from the electrical generator turbine.

In addition to the specific design of the process facility, FIG. 1, fume scrubbing units [20] will be located to collect obnoxious fumes at each point where refuses is exposed to the atmosphere. The fumes will be ducted to a scrubber [21] where odor causing fumes will be removed. The resulting clean air will be exhausted to the atmosphere and the residue from the scrubber [21] will be sent to the residue treatment area [22] for further processing.

In conjunction, residual products from all areas of the process (except the inert, non-polluting residue from the precipitator) will be sent to the residue treatment area [22] for additional processing. The residue will be rendered into non-polluting substances and disposed of in an appropriate manner. Treatment processes will vary depending upon the makeup of the specific residue being processed at a particular time.

While the particular municipal refuse oxidation system as herein shown and disclosed in detail is fully capable of obtaining the objects and providing the advantages herein before stated, it should be understood that it is only illustrative of the presently preferred embodiment of the invention and that no limitations are intended to details of construction or design herein shown other than as defined in the following claims.

What is claimed is:

1. A process for the complete oxidation of municipal refuse/waste providing;
   a specified amount of properly prepared refuse/waste;
   a specified temperature for complete oxidation of refuse/waste materials;
   a specified volume of natural gas;
   a specified volume of injected pure oxygen;
   a closed system requiring no landfills or sewers and that does not violate any clean air standards;
   heating of refuse/waste to 3200 degree F. and converting said refuse/waste materials into environmentally safe restructured products.

2. A process for oxidation of refuse/waste as in claim 1 wherein said refuse/waste heated to 3200 degrees F. and converted to gaseous and liquid substances.

3. A process for the oxidation of refuse/waste as in claim 1 wherein natural gas will be used as a burning agent with the injection of pure oxygen as an oxidant.

4. A process for the oxidation of refuse/waste as in claim 2 wherein the high energy content of the gaseous substance will be utilized to produce steam then will be compressed and cooled to the liquefaction point and fractionated into environmentally safe saleable products.

5. A process for the oxidation of refuse/waste as in claim 2 wherein the liquid ash residue will be restructured into environmentally safe saleable products.

6. A process for the oxidation of refuse/waste as in claim 1, claim 4, or claim 5 wherein the excess steam and water created by the process will be restructured into distilled water.

7. A process for the oxidation of refuse/waste as in claim 1 wherein said materials will be oxidated in an enclosed system facility with no discharge stacks thereby requiring no landfills or sewers and conforms to all clean air standards.

* * * * *